United States Patent
Guo

(10) Patent No.: US 12,105,929 B2
(45) Date of Patent: Oct. 1, 2024

(54) DISPLAY METHOD, DISPLAY APPARATUS, AND ELECTRONIC DEVICE

(71) Applicant: VIVO MOBILE COMMUNICATION CO., LTD., Dongguan (CN)

(72) Inventor: Guangrao Guo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/222,473

(22) Filed: Jul. 16, 2023

(65) Prior Publication Data

US 2023/0359323 A1    Nov. 9, 2023

Related U.S. Application Data

(63) Continuation of application No. PCT/CN2022/071962, filed on Jan. 14, 2022.

(30) Foreign Application Priority Data

Jan. 21, 2021 (CN) .......................... 202110081411.8

(51) Int. Cl.
*G06F 3/04817* (2022.01)
*G06F 3/04815* (2022.01)

(52) U.S. Cl.
CPC ...... *G06F 3/04817* (2013.01); *G06F 3/04815* (2013.01)

(58) Field of Classification Search
CPC .... G06F 3/0482; G06F 3/016; G06F 3/04817; G06F 3/04883; G06F 3/04845; G06F 9/4451; G06F 9/451; G06F 21/00; G06F 21/10; G06F 21/629; G06F 3/0488; G06F 3/04847; G06F 2203/04105; G06F 3/0414;

(Continued)

(56) References Cited

U.S. PATENT DOCUMENTS

| 11,954,311 B2* | 4/2024 | Li ........................ G06F 3/04883 |
| 2002/0067378 A1* | 6/2002 | Abdelhadi ............ G06F 3/0481 |
| | | 715/836 |

(Continued)

FOREIGN PATENT DOCUMENTS

| CN | 106201204 A | 12/2016 |
| CN | 108319408 A | 7/2018 |

(Continued)

OTHER PUBLICATIONS

International Search Report issued in corresponding International Application No. PCT/CN2022/071962, mailed Apr. 13, 2022, 7 pages.

(Continued)

*Primary Examiner* — Rayeez R Chowdhury
(74) *Attorney, Agent, or Firm* — IPX PLLC

(57) ABSTRACT

A display method, a display apparatus, and an electronic device are provided. The display, method includes: receiving a first input by a user to an icon of a target application. The icon of the target application is a two-dimensional icon. The method further includes displaying a three-dimensional icon in response to the first input. The three-dimensional icon includes an icon and a sub icon of the target application, and the sub icon is a quick entry to an application interface of the target application or another application.

20 Claims, 11 Drawing Sheets

(58) Field of Classification Search
CPC ......... G06F 3/0485; G06F 2203/04101; G06F 3/03547; G06F 3/0481; G06F 3/04842
See application file for complete search history.

(56) References Cited

U.S. PATENT DOCUMENTS

| | | | | |
|---|---|---|---|---|
| 2010/0093400 | A1* | 4/2010 | Ju | G06F 3/04817 |
| | | | | 715/702 |
| 2011/0096006 | A1* | 4/2011 | Jeong | H04M 1/72469 |
| | | | | 345/173 |
| 2011/0164042 | A1* | 7/2011 | Chaudhri | G06F 3/0481 |
| | | | | 715/702 |
| 2012/0151400 | A1* | 6/2012 | Hong | G06F 3/04817 |
| | | | | 715/769 |
| 2013/0067376 | A1* | 3/2013 | Kim | G06F 3/0488 |
| | | | | 715/769 |
| 2013/0082965 | A1* | 4/2013 | Wada | G06F 3/04883 |
| | | | | 345/173 |
| 2013/0346911 | A1* | 12/2013 | Sripada | G06F 3/04817 |
| | | | | 715/782 |
| 2019/0026004 | A1* | 1/2019 | Caen | G06F 3/04815 |

FOREIGN PATENT DOCUMENTS

| | | |
|---|---|---|
| CN | 109711195 A | 5/2019 |
| CN | 111782030 A | 10/2020 |
| CN | 112783388 A | 5/2021 |
| EP | 2649508 A1 | 10/2013 |

OTHER PUBLICATIONS

First Office Action issued in corresponding CN Patent Application No. 202110081411.8, dated Dec. 20, 2021, 10 pages.
Second Office Action issued in corresponding CN Patent Application No. 202110081411.8, dated Jul. 13, 2022, 6 bages.

* cited by examiner

DISPLAY METHOD, DISPLAY APPARATUS, AND ELECTRONIC DEVICE

CROSS-REFERENCE TO RELATED APPLICATIONS

This application is a continuation of International Application No. PCT/CN2022/071962, filed on Jan. 14, 2022, which claims priority to Chinese Patent Application No. 202110081411.8, filed on Jan. 21, 2021. The entire contents of each of the above-referenced applications are expressly incorporated herein by reference.

TECHNICAL FIELD

This application relates to the field of communications technologies, and in particular, to a display method, a display apparatus, and an electronic device.

BACKGROUND

With the rapid development of mobile Internet technologies, smart phones have been used by innumerable families. In addition, application stores provide a variety of applications for users to download, such as shopping applications, photography applications, instant messaging applications, payment applications, and gaming applications. Most applications installed on mobile phones generate a two-dimensional icon on a desktop as entries of the applications.

Currently, desktop icons of applications are all two-dimensional, serving as the only entries of the applications, which provides a simple function. If an additional entry is needed, usually another desktop icon is generated to be an entry of a sub function in the application. Desktop two-dimensional icons have an obvious disadvantage. These icons have a simple function and only lead to specific pages. If entries to sub pages are needed, more desktop icons need to be generated, thereby resulting in excessive icons that are difficult to find.

In addition, implementation of certain functions such as taking photos and sharing on the Moment requires collaborations between various applications. In an actual operation process, this entire process is fragmented. A user first needs to take photos with a camera, then click on the photos and share it on the Moment. For another example, when a user participates in a coupon drawing activity in a certain application at 12 o'clock, the user needs to set an alarm first, and then manually click on the application to enter an interface of the coupon drawing activity to participate. This undoubtedly increases difficulty for the user to operation and efficiency of function execution is relatively low.

SUMMARY

Embodiments of this application are intended to provide a display method, a display apparatus, and an electronic device.

This application is implemented as follows.

According to a first aspect, an embodiment of this application provides a display method, and the method includes:
receiving a first input by a user to an icon of a target application, where the icon of the target application is a two-dimensional icon; and
displaying a three-dimensional icon in response to the first input, where the three-dimensional icon includes an icon and a sub icon of the target application, and the sub icon is a quick entry to an application interface of the target application or another application.

According to a second aspect, an embodiment of this application provides a display apparatus, and the apparatus includes:
a first receiving module, configured to receive a first input by a user to an icon of a target application, where the icon of the target application is a two-dimensional icon; and
a first response module, configured to display a three-dimensional icon in response to the first input, where the three-dimensional icon includes an icon and a sub icon of the target application, and the sub icon is a quick entry to an application interface of the target application or another application.

According to a third aspect, an embodiment of this application provides an electronic device, where the electronic device includes a processor, a memory, and a program or an instruction stored in the memory and capable of running on the processor, and when the program or the instruction is executed by the processor, the steps of the display method according to the first aspect are implemented.

According to a fourth aspect, an embodiment of this application provides a readable storage medium, where the readable storage medium stores a program or an instruction, and when the program or the instruction is executed by a processor, the steps of the display method according to the first aspect are implemented.

According to a fifth aspect, an embodiment of this application provides a chip, where the chip includes a processor and a communications interface, the communications interface is coupled to the processor, and the processor is configured to run a program or an instruction, to implement the display method according to the first aspect.

According to a sixth aspect, a computer program product is provided, where the computer program product is stored in a non-volatile storage medium, and the computer program product is executed by at least one processor, to implement the steps of the display method according to the first aspect.

According to a seventh aspect, a communications device is provided and configured to perform the display method according to the first aspect.

In the embodiments of this application, by generating a three-dimensional icon of a target application and adding a sub icon to the three-dimensional icon, quick entries of a plurality of application interfaces may be associated with the three-dimensional icon, so that it is convenient to quickly find and enter the application interface associated with the target application. In addition, a display area occupied by the icons and the quick entries can be reduced, and a display interface is concise.

DETAILED DESCRIPTION

The following clearly describes the technical solutions in embodiments of this application with reference to the accompanying drawings in the embodiments of this application. Apparently, the described embodiments are some rather than all of the embodiments of this application. All other embodiments obtained by a person of ordinal skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way is interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specifications and the claims, "and/or" represents at least one of connected objects, and a character "/" generally represents an "or" relationship between associated objects.

The following describes in detail the display method, the display apparatus, and the electronic device provided in the embodiments of this application through embodiments and application scenarios thereof with reference to the accompanying drawings.

Figure 1:
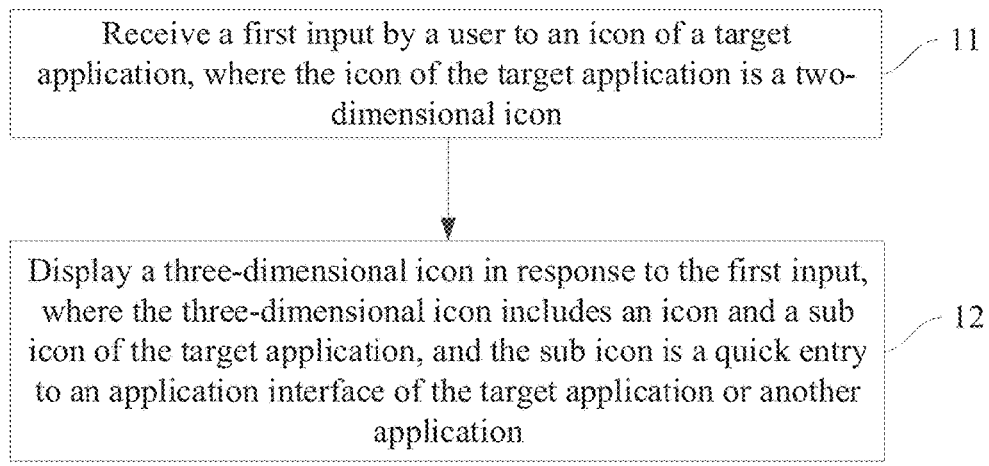
FIG. 1 is a schematic flowchart of a display method according to an embodiment of this application.

FIG. 1 is a schematic flowchart of a display method according to an embodiment of this application. As shown in FIG. 1, the display method in the embodiments of this application may include the following steps:

Step 11: Receive a first input by a user to an icon of a target application, where the icon of the target application is a two-dimensional icon; and Step 12: Display a three-dimensional icon in response to the first input, where the three-dimensional icon includes an icon and a sub icon of the target application, and the sub icon is a quick entry to an application interface of the target application or another application.

In the embodiments of this application, an icon that is displayed on a desktop and that corresponds to the target application is a two-dimensional icon. When receiving the first input by the user to the icon of the target application, the electronic device displays the three-dimensional icon in response to the first input. The three-dimensional icon is displayed as a three-dimensional image, and the three-dimensional image may include at least one surface. For example, when the three-dimensional image is a sphere, the three-dimensional image has one surface, while when the three-dimensional image is a cube, the three-dimensional image has six surfaces. When the electronic device displays the three-dimensional icon, one of or some of the surfaces of the three-dimensional icon can be displayed. The icon of the target application is switched to display as a three-dimensional icon, so that a sub icon can be accommodated in a three-dimensional space of the three-dimensional icon or placed on a surface of the three-dimensional icon when a sub icon is added to the three-dimensional icon. It can be avoided that the sub icon occupies an excessively, large display area of a desktop, which makes desktop look unorganized. The sub icon may be a quick entry to an application interface of the target application, or a quick entry to an application interface of any other application. In this way, the target application may be associated with a plurality of sub icons to quickly find and enter a relevant application interface.

Figure 2:
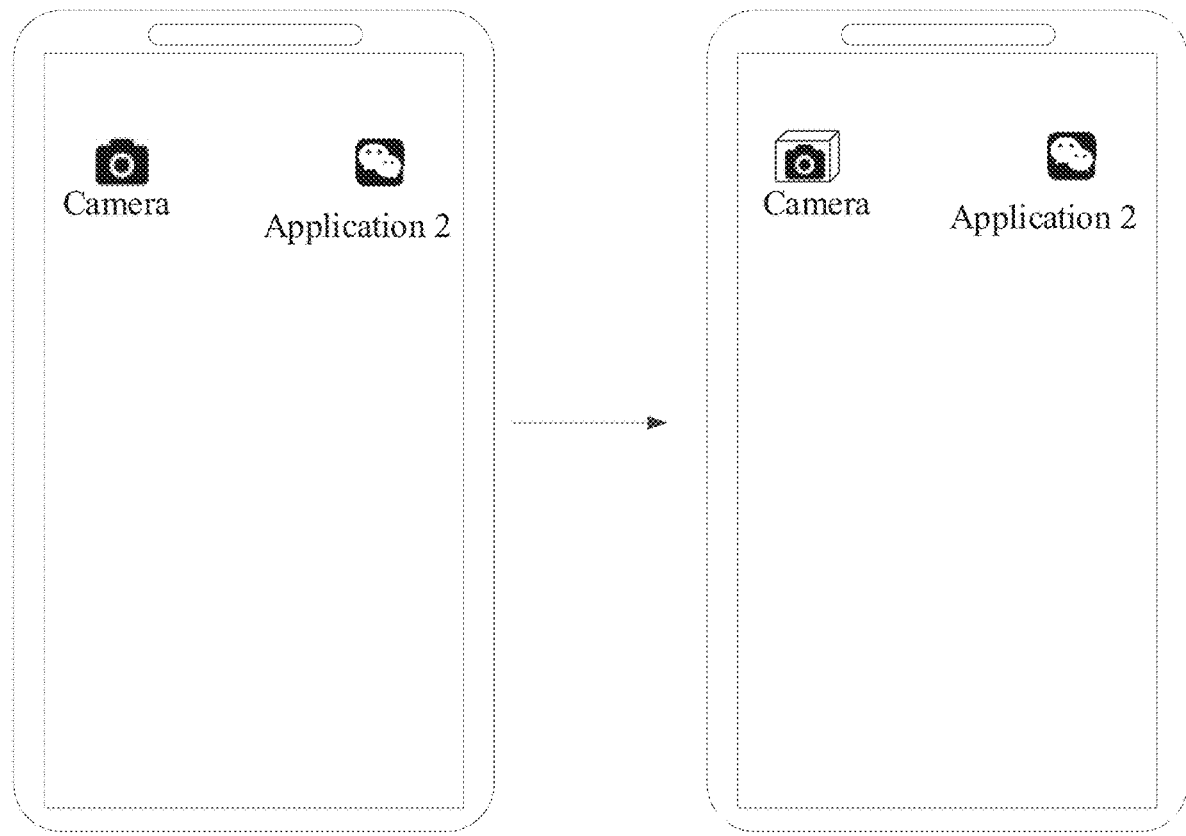
FIG. 2 is a schematic diagram of a three-dimensional icon being generated according to an embodiment of this application.
Figure 3:
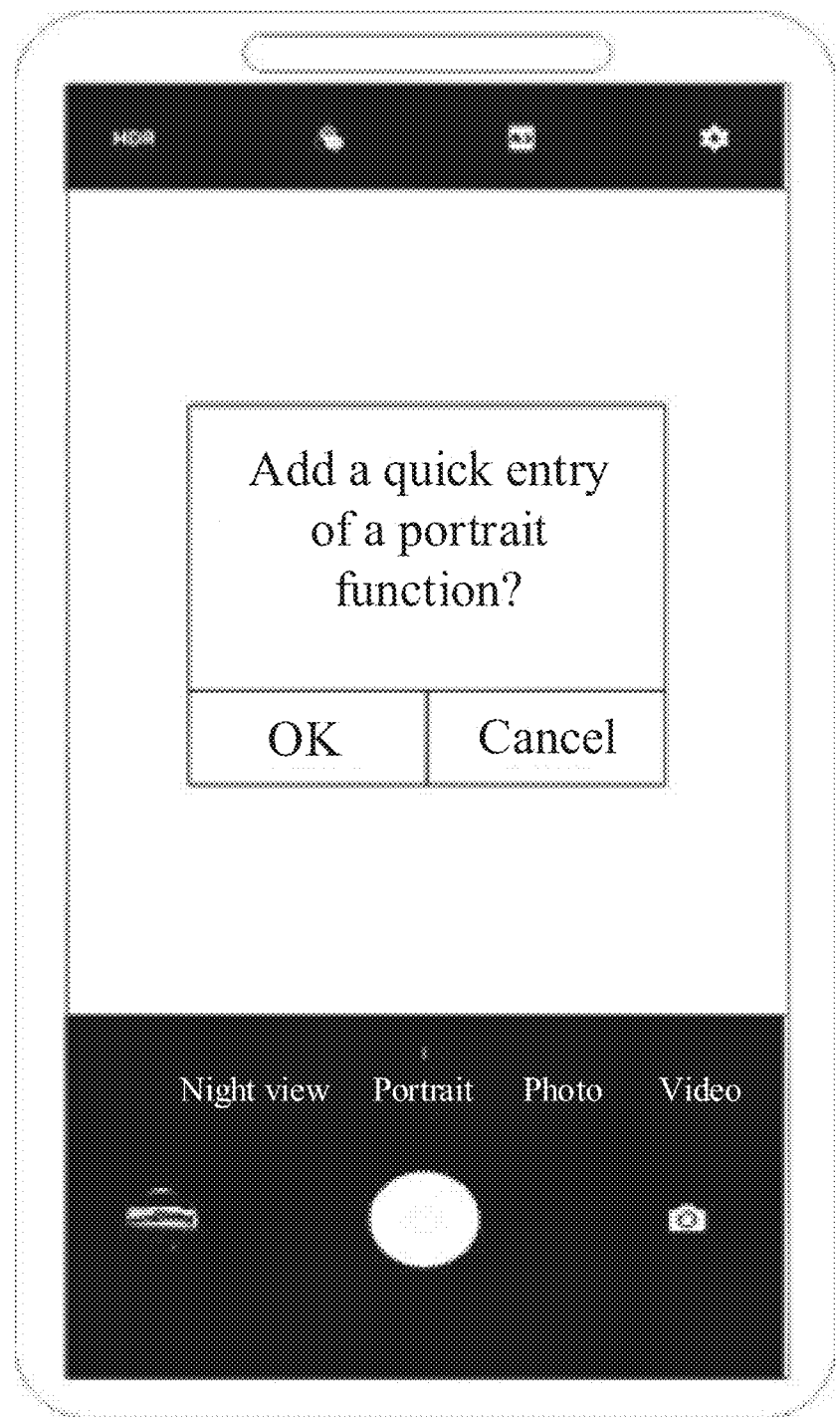
FIG. 3 is a first schematic diagram of a sub icon being added to a three-dimensional icon according to an embodiment of this application.

Refer to FIG. 2 and FIG. 3. FIG. 2 is a schematic diagram of a three-dimensional icon being generated according to an embodiment of this application, and FIG. 3 is a first schematic diagram of a sub icon being added to a three-dimensional icon according to an embodiment of this application. In the embodiments of this application, the first input may be an input to the icon of the target application, for example, an input of double clicking the icon of the target application. In some alternative embodiments, the first input may be an input to a certain functional interface of the target application, for example, an input of clicking an add button on an application interface of the target application. After the add button is clicked, the application interface may be added as a sub image of the three-dimensional icon of the target application. In some alternative embodiments, the first input may be an input to the icon of the target application and a certain application interface of another application, for example, an input of dragging an application interface of the another application to the icon of the target application. In an optional implementation, the first input may include two sub inputs. For example, a first sub input may be an input of double clicking the icon of the target application, and the first sub input is used to switch the icon of the target application from a two-dimensional icon to a three-dimensional icon. As shown in FIG. 2, for example, the target application is a camera, and after the first sub input is received, the icon corresponding to the camera is switched from a two-dimensional icon to a three-dimensional icon. The three-dimensional icon is in the shape of a cube. A second sub input may be an input that initiates adding a sub icon on any application interface of the target application. The second sub input is used to add a sub icon to the three-dimensional icon. The sub icon is a quick entry corresponding to the application interface of the target application. As shown in FIG. 3, for example, the target application is a camera, and the camera has a plurality of functional interfaces such as a night view, a portrait, and video recording. After a user touches and holds a corresponding functional interface, the user is prompted whether to add a quick entry. After an OK button is clicked, a corresponding sub icon of the functional interface is added to the three-dimensional icon. A corresponding interface can be quickly entered by using the sub icon.

Figure 4:
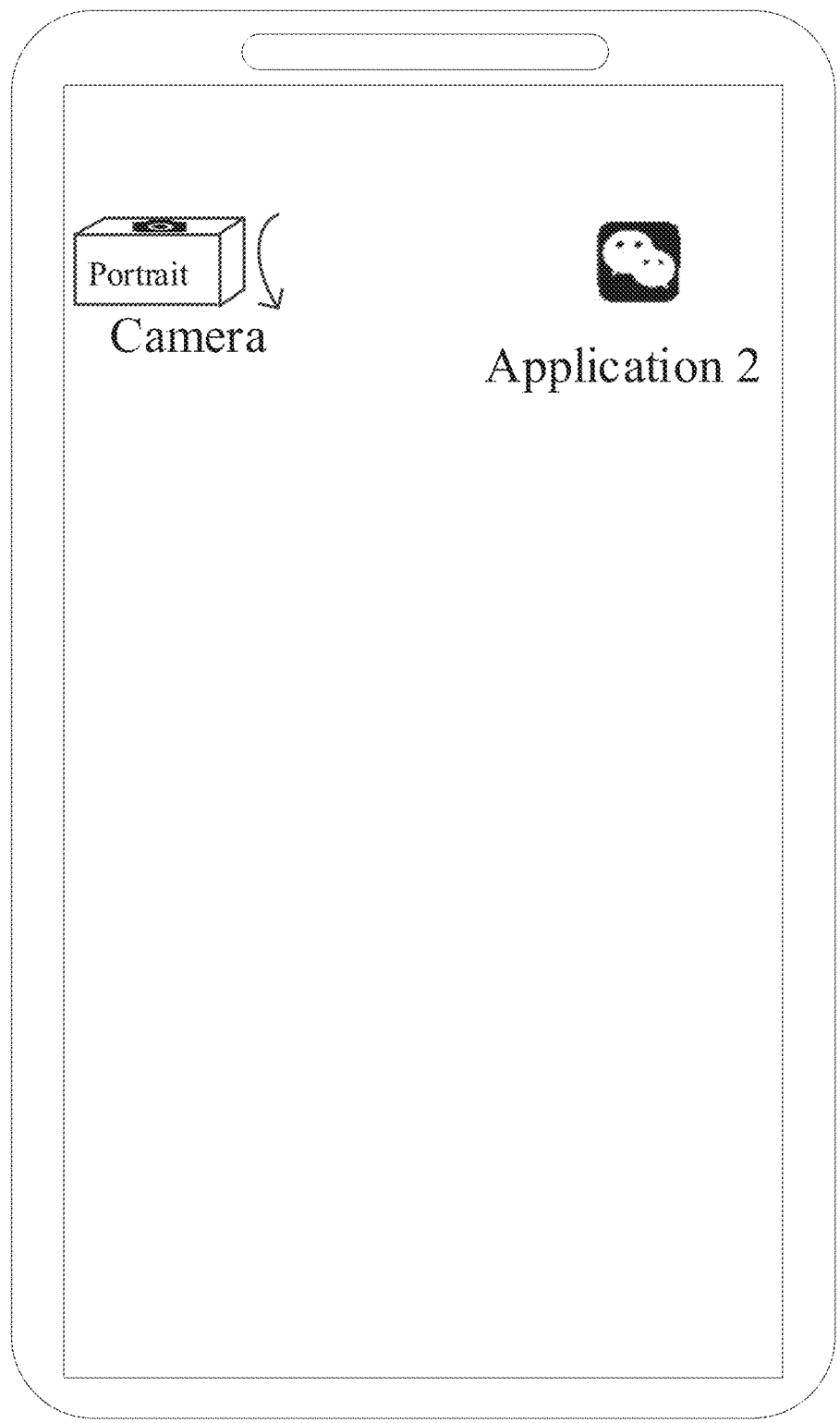
FIG. 4 is a schematic diagram of a three-dimensional icon added with a sub icon according to an embodiment of this application.

FIG. 4 is a schematic diagram of a three-dimensional icon added with a sub icon according to an embodiment of this application. As shown in FIG. 4, for example, the target application is a camera, and a sub icon of a portrait is displayed on one surface of a three-dimensional icon of the camera. The camera's interface of shooting in a portrait mode can be quickly entered by using the sub icon of the portrait. Because the three-dimensional icon is a three-dimensional image, after the three-dimensional icon can be selected, a display surface of the three-dimensional can be switched by using control inputs such as left and right swiping or up and down swiping (for example, an arrow as shows in FIG. 4). As shown in FIG. 4, the sub icon of the portrait is displayed on the front of the three-dimensional icon, while the original two-dimensional icon corresponding to the camera may be displayed on the top of the three-dimensional icon. A default interface of the camera can be entered by using the two-dimensional icon. To facilitate entering an application interface by clicking or other inputs, the user can make the display surface of the three-dimensional icon face the user directly by using control inputs such as swiping, thereby implementing switching of the display surface and helping the user select different application interfaces. However, because a plurality of sub icons can be placed on the three-dimensional icon, a quantity of icons can be greatly reduced on the desktop, so that the desktop looks more concise. In addition, an associated sub icon can be placed on the same three-dimensional icon, thereby making it convenient for users to quickly find and enter the target application interface.

In another optional implementation, the input by the user for adding the sub icon to the icon of the target application may only include one sub input. For example, the sub input may be an input of dragging an icon of an application other than the target application to the icon of the target application (initially displayed as a two-dimensional icon). When the drag input is completed, the icon of the target application is switched from a two-dimensional icon to a three-dimensional icon. In addition, a sub icon is added to the three-dimensional icon, and the sub icon is a quick entry to a default interface of the application corresponding to the dragged application icon.

Figure 5:
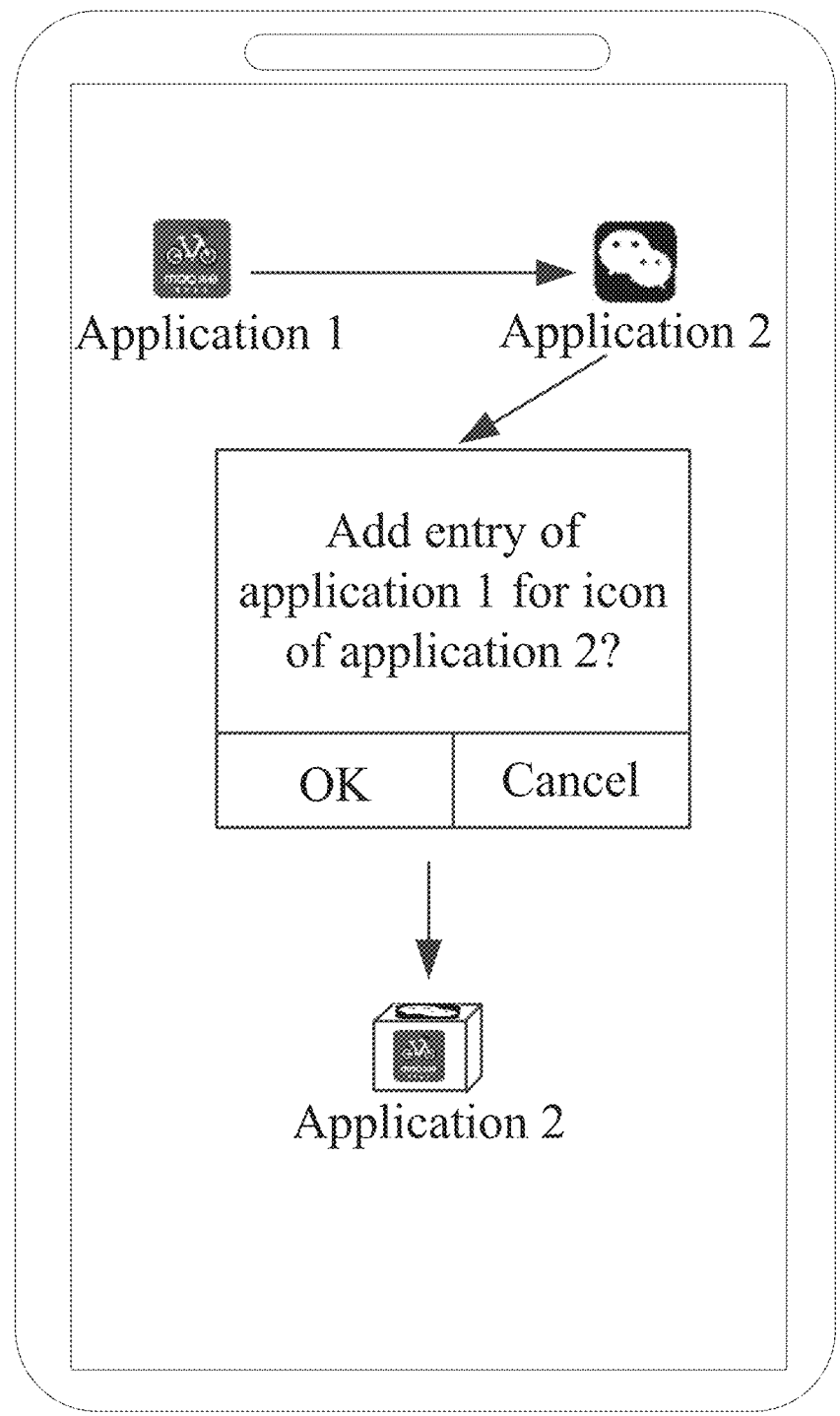
FIG. 5 is a second schematic diagram of a sub icon being added to a three-dimensional icon according to an embodiment of this application.

FIG. 5 is a second schematic diagram of a sub icon being added to a three-dimensional icon according to an embodiment of this application. As shown in FIG. 5, for example, the dragged icon is an icon of an application 1, and the target application is an application 2. When the icon of the application 1 is dragged to a position in which an icon of the application 2 is located, a pop-up window is displayed to prompt whether to add an entry of the application 1 for the icon of the application 2. If the user clicks OK, the icon corresponding to the application 2 is switched from a two-dimensional icon to a three-dimensional icon. In addition, a sub icon is added to the three-dimensional icon. The sub icon corresponds to a quick entry of a default interface of the application 1. The default interface of the application 1 can be quickly entered by using the sub icon. In this way, a sub icon of another application related to the application can be added to the three-dimensional icon of the frequently-used target application, so that the user can quickly find a relevant application by using the three-dimensional icon of the target application, and a default interface of a corresponding application can be entered.

In the embodiments of this application, for example, the displaying a three-dimensional icon includes:
switching the icon of the target application from a two-dimensional icon to a three-dimensional icon, adding a sub icon to the three-dimensional icon, and placing and hiding the sub icon in a three-dimensional space of the three-dimensional icon.

Because the three-dimensional icon is a three-dimensional image, when a sub icon is added to the three-dimensional icon, the sub icon can be accommodated in a three-dimensional space of the three-dimensional icon, and the added sub icon is hidden.

It may be understood that the three-dimensional icon has a volume, so that the sub icon can be accommodated in the three-dimensional space of the three-dimensional icon.

Figure 6:
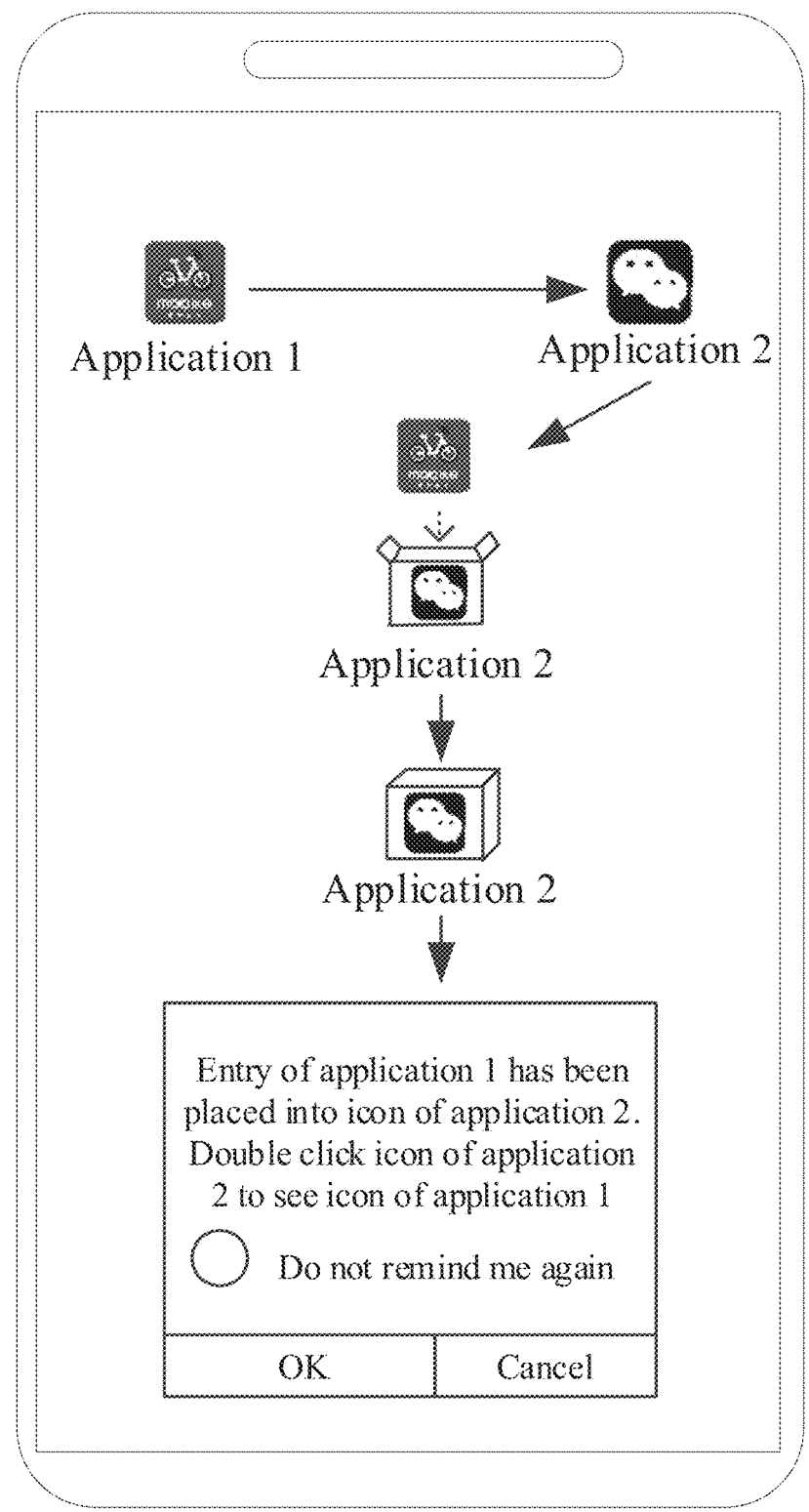
FIG. 6 is a schematic diagram of a sub icon being placed and hidden in a three-dimensional space of a three-dimensional icon according to an embodiment of this application.

FIG. 6 is a schematic diagram of a sub icon being placed and hidden in a three-dimensional space of a three-dimensional icon according to an embodiment of this application. As shown in FIG. 6, for example, the dragged application icon is an icon of an application 1, and the target application is an application 2. When the icon of the application 1 is dragged to a position of a corresponding two-dimensional icon of the application 2, the icon of application 2 is switched from a two-dimensional icon to a three-dimensional icon. For example, when the three-dimensional icon is in the shape of a cube, the three-dimensional icon may also appear in the form of an opened box. When the user follows an instruction to place the icon of the application 1 into the three-dimensional icon of the application 2, the icon of the application 1 is hidden in an internal space of the three-dimensional icon of the application 2, that is, a process of adding a sub icon to the three-dimensional icon of the application 2 is completed. In addition, the icon of the application 1 serves as a sub icon on the three-dimensional icon of the application 2. After the addition is completed, the three-dimensional icon corresponding to the application 2 can be restored to a shape of a closed cube. In some embodiments, when the icon of the application 1 is placed in the three-dimensional icon of the application 2, a pop-up window can also be displayed to remind the user that "The entry of the application 1 has been placed in the icon of the application 2. Double click the icon of the application 2 to see the entry of the application 1". If the user checks a box "Do not remind me again", when a similar operation is performed, there is only a toast reminder (a toast is a simple message prompt box that cannot be clicked and is displayed for a short time). In this way, a sub icon of another application related to the application can be added to the three-dimensional icon of the frequently-used target application, so that the user can quickly find a relevant application by using the three-dimensional icon of the target application, and a default interface of a corresponding application can be entered.

In the embodiments of this application, for example, after a sub icon is added to the three-dimensional icon, the display method further includes:
receiving a viewing input by the user to view the sub icon in the three-dimensional space of the three-dimensional icon; and
in response to the viewing input, displaying the sub icon in the three-dimensional space of the three-dimensional icon on a periphery of the three-dimensional icon.

Figure 7:
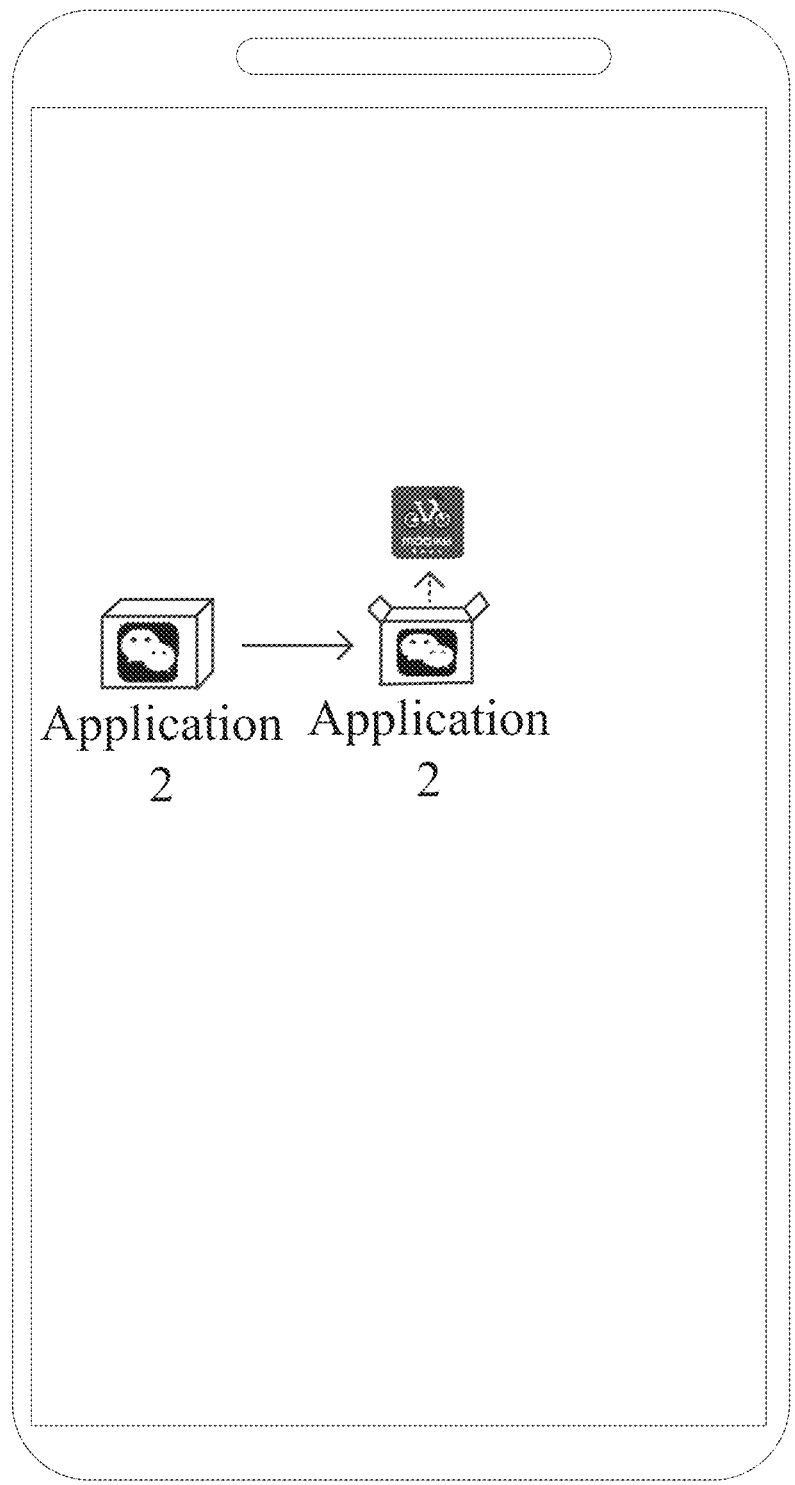
FIG. 7 is a schematic diagram of a sub icon in a three-dimensional space of a three-dimensional icon being viewed according to an embodiment of this application.

FIG. 7 is a schematic diagram of a sub icon in a three-dimensional space of a three-dimensional icon being viewed according to an embodiment of this application. As shown in FIG. 7, after an input for viewing a hidden sub icon in a three-dimensional space of a three-dimensional icon corresponding to an application 2 is received, a three-dimensional icon corresponding to the application 2 appears in the form of an opened box. In addition, a sub icon corresponding to an application 1 that is placed in the three-dimensional icon is displayed. The icon is displayed on a periphery of the three-dimensional icon. In some embodiments, the viewing input may be an input of double clicking the three-dimensional icon of the application 2, and when the sub icon is displayed, an arrow can be added between the three-dimensional icon and the sub icon. A direction of the arrow points from the three-dimensional icon to the sub icon. In a case that there is only one sub icon in the three-dimensional space of the three-dimensional icon, the sub icon can be displayed directly above or below the three-dimensional icon. In a case that there are a plurality of sub icons, the plurality of sub icons can be displayed on the periphery of the three-dimensional icon, and arranged in a circle outward from the nearest display position. In this method, it is convenient for the user to view the sub icon associated with the three-dimensional icon, and a visual effect of viewing the icon is better, thereby improving user experience.

In the embodiments of this application, for example, the displaying a three-dimensional icon includes:
  switching the icon of the target application from a two-dimensional icon to a three-dimensional icon, and adding a sub icon to a surface of the three-dimensional space of the three-dimensional icon, where the three-dimensional icon includes at least one surface of the three-dimensional space.

Because the three-dimensional icon is a three-dimensional image, when a sub icon is added to the three-dimensional icon, the sub icon can be added on a surface of the three-dimensional space of the three-dimensional icon, and the added sub icon is displayed on the three-dimensional icon. As shown in FIG. 4, for example, the target application is a camera, and a sub icon corresponding to an interface of portrait shooting is displayed on one surface of three-dimensional icon of the camera. It should be noted that an original two-dimensional icon of the camera may also continue to be displayed on the three-dimensional icon of the camera. The original two-dimensional icon serves as a quick entry of a default interface of the camera. In some embodiments, there may be one or more surfaces of the three-dimensional space of the three-dimensional icon. For example, in a case that the three-dimensional icon is a sphere, there is one surface of the three-dimensional space of the three-dimensional space. To add more sub icons, the surface of the three-dimensional space (that is, a surface of the sphere) may be divided into a plurality of regions, a corresponding sub icon can be displayed on each region. A user can switch between different sub icons by swiping the sphere. For another example, in a case that the three-dimensional icon is a cube, there are six surfaces of the three-dimensional space of the three-dimensional icon. In this case, each surface can be added with a corresponding sub icon. By rotating the cube, different sub icons can be switched.

In the embodiments of this application, for example, after the adding a sub icon to a surface of the three-dimensional space of the three-dimensional icon, the method further includes:
  receiving an associated input by the user to at least two target sub icons of at least two three-dimensional icons; and
  in response to the associated input, associating and binding an application interface corresponding to the at least two target sub icons.

After the three-dimensional icon of each of the two applications is obtained according to the above content, if the associated input by the user to the at least two target sub icons of the at least two three-dimensional icons is received, an application interface corresponding to the at least two target sub icons is associated and bound. The associated input may be an input that connects the target sub icon of the at least two three-dimensional icons, that is, selecting one target sub icon from at least one three-dimensional icon. In this way, the at least two applications can be associated and bound, thereby combining the at least two applications to implement preset functions. The association and binding mean binding application interfaces corresponding to the at least two target sub icons. When an event is triggered by the application interface corresponding to one of the target sub icons, an application interface corresponding to another target sub icon performs a preset operation corresponding to the event, thereby implementing various functions of the at least two applications.

In the embodiments of this application, after the associating and binding an application interface corresponding to the at least two target sub icons, the method further includes:
  in a case that a first event is triggered on an application interface corresponding to one of the target sub icons, performing a preset operation corresponding to the first event on an application interface corresponding to another one of the target sub icons.

Figure 8:
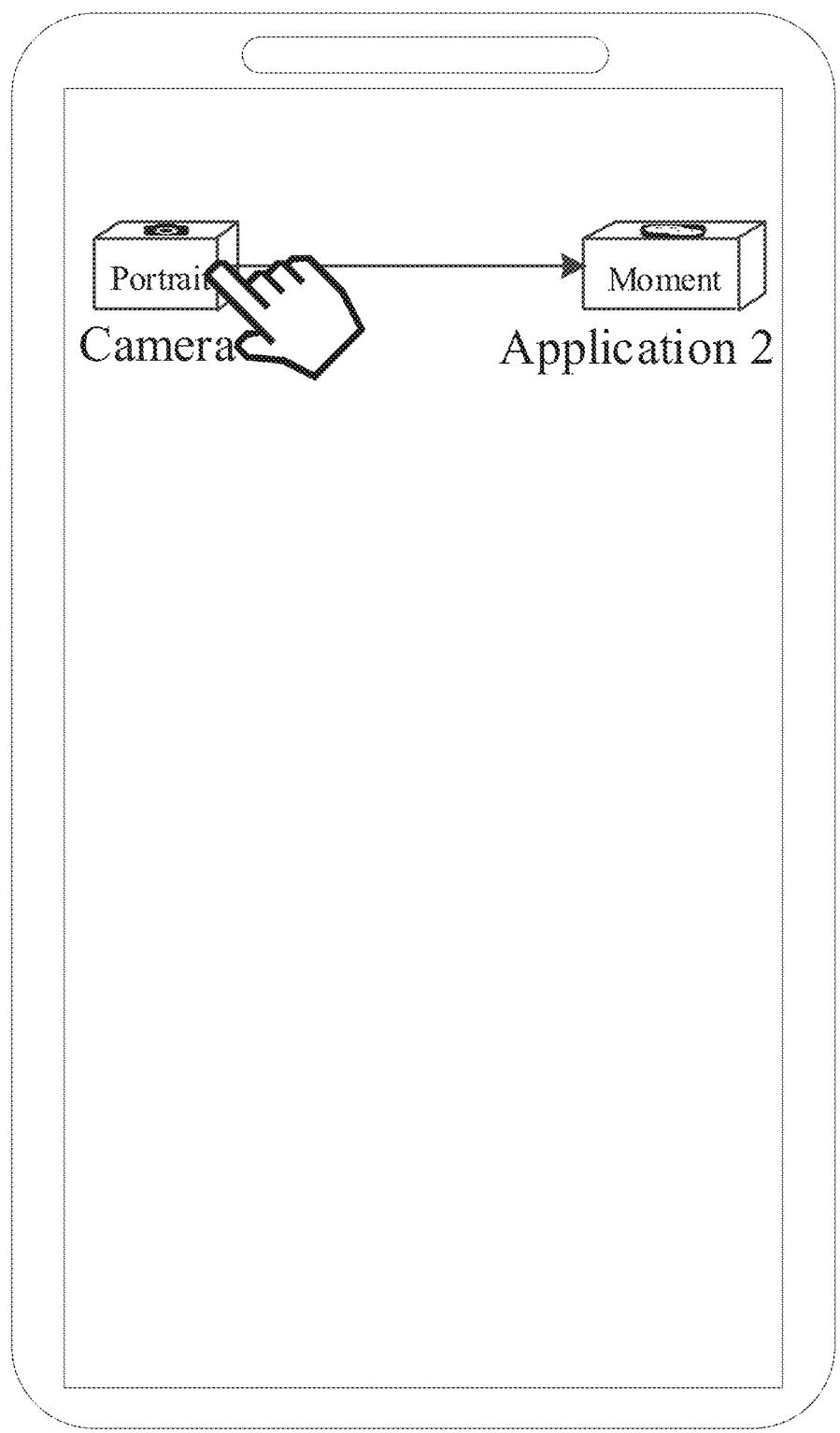
FIG. 8 is a first schematic diagram of an application interface corresponding to two target sub icons being associated and bound according to an embodiment of this application.
Figure 9:
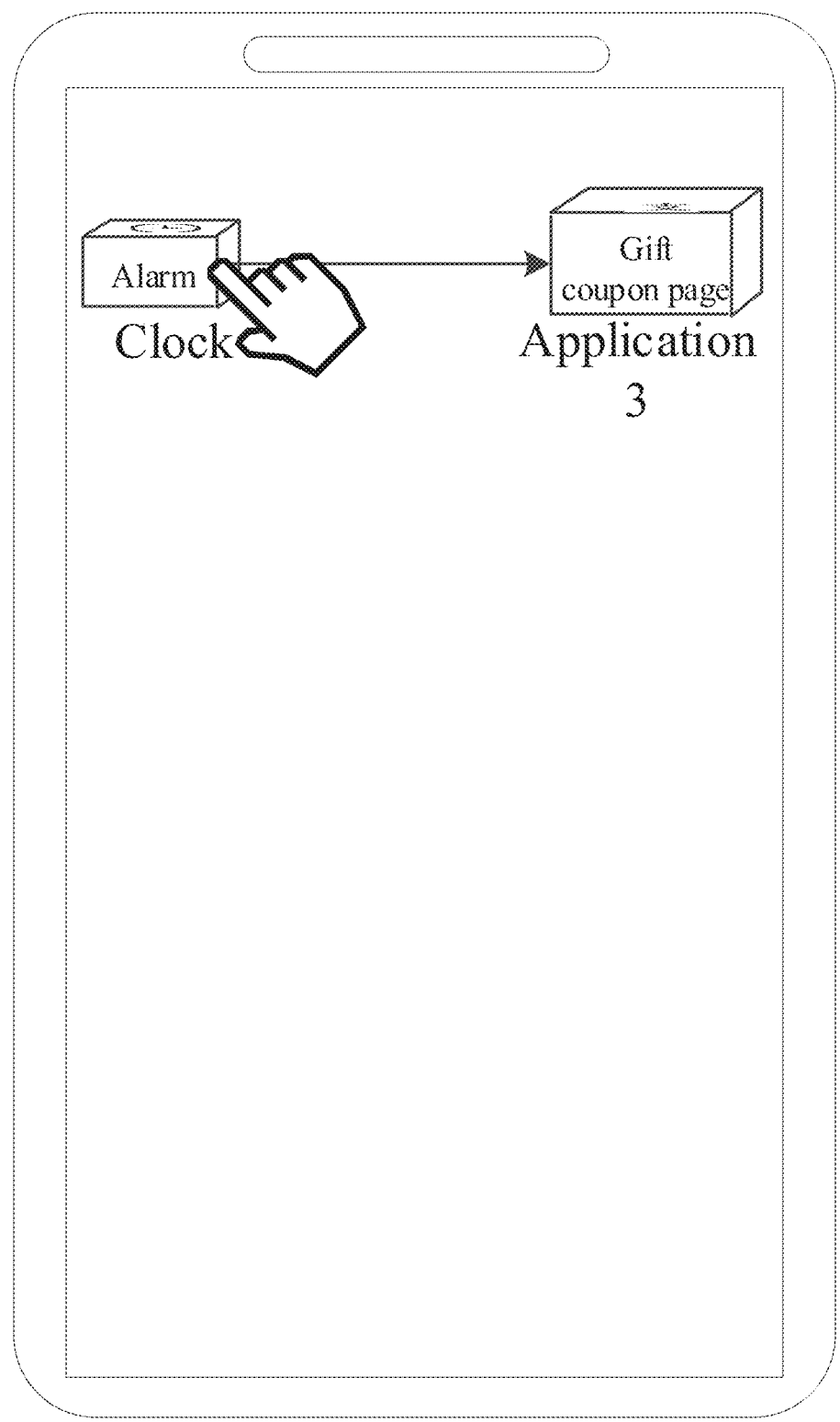
FIG. 9 is a second schematic diagram of an application interface corresponding to two target sub icons being associated and bound according to an embodiment of this application.

Refer to FIG. 8 and FIG. 9. FIG. 8 is a first schematic diagram of an application interface corresponding to two target sub icon being associated and bound according to an embodiment of this application, and FIG. 9 is a second schematic diagram of an application interface corresponding to two target sub icons being associated and bound according to an embodiment of this application. As shown in FIG. 8, for example, application interfaces of two target sub icons that are associated and bound are a portrait shooting interface of a camera and a Moment interface of the application 2 respectively. In a case that portrait shooting is completed on the portrait shooting interface of the camera, the Moment interface of the application 2 automatically obtains portrait photos that are obtained on the portrait shooting interface. Therefore, after the photo shooting is completed, the photos are automatically added to a sharing interface of the Moment, thereby saving tedious steps in which the user takes photos with a camera, clicks the photos, and then shares the photos on the Moment. As shown in FIG. 9, for example, the application interfaces of the two target sub icons that are associated and bound are an alarm interface of a clock and an interface of an application 3 for a gift coupon page. When the alarm is triggered on the alarm interface of the clock, the interface of the application 3 for the gift coupon page is automatically opened to allow the user to directly draw a gift coupon, thereby saving time.

In the embodiments of this application, after the displaying a three-dimensional icon, the method further includes:
  receiving a start input by the user to the sub icon; and
  starting an application interface corresponding to the sub icon in response to the start input.

In other words, after a sub icon is added to the three-dimensional icon, if a start input to a certain sub icon of the three-dimensional icon is received, an application interface corresponding to the sub icon can be opened. In some embodiments, the start input may be an input of clicking a sub icon. When an application interface corresponding to a certain sub icon needs to be start, the three-dimensional icon can be rotated to display the sub icon on a surface of the three-dimensional space facing directly the user.

In the embodiments of this application, after the displaying a three-dimensional icon, the method further includes:
receiving a pressing input by the user to the three-dimensional icon; and
in response to the pressing input, displaying an exploded rendered image and uninstallation prompt information of the three-dimensional icon, where the uninstallation prompt information is used to prompt the user whether to uninstall an initial application corresponding to the three-dimensional icon.

Because the three-dimensional icon is a three-dimensional space, the three-dimensional icon may be considered to be in a three-dimensional closed form. Therefore, when an input by the user of pressing the three-dimensional icon, the three-dimensional icon is compressed or even cracks, that is, an uninstallation operation of the application is triggered. In this method, it is convenient for the user to uninstall the application, and the uninstallation process is very fun, thereby improving user experience.

Figure 10:
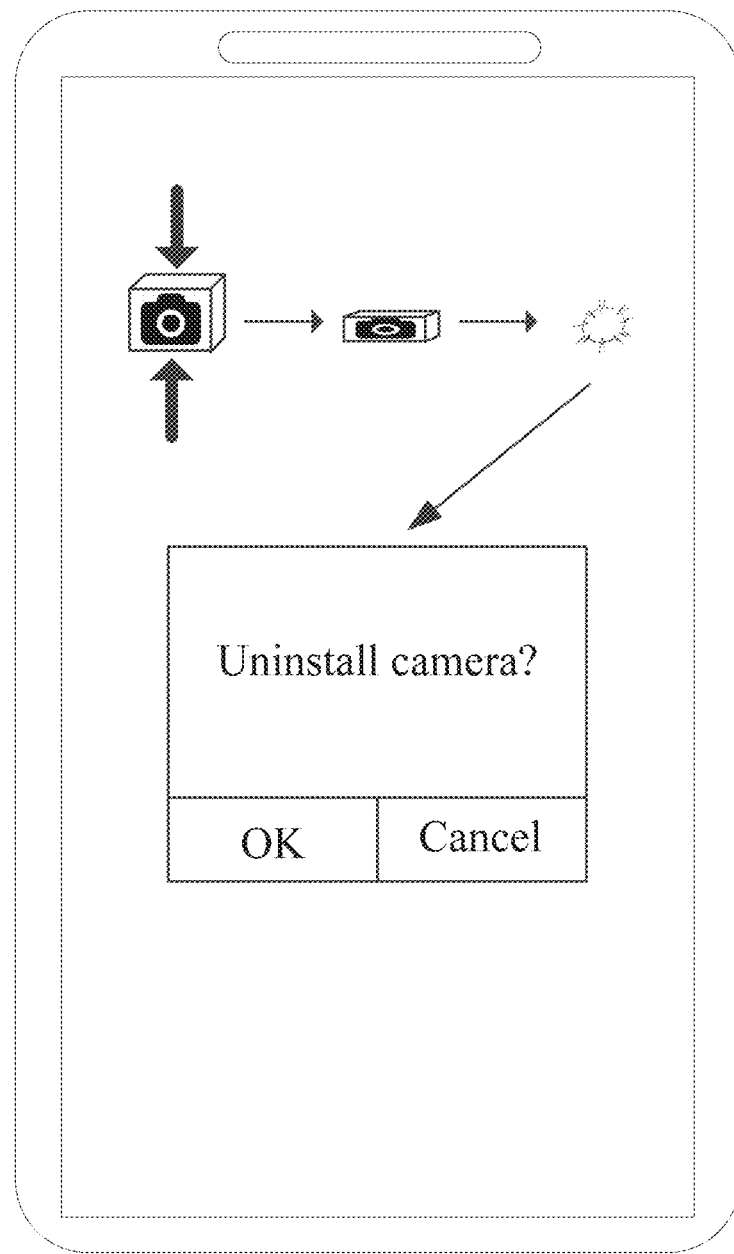
FIG. 10 is a schematic diagram of a three-dimensional icon being uninstalled according to an embodiment of this application.

FIG. 10 is a schematic diagram of a three-dimensional icon being uninstalled according to an embodiment of this application. As shown in FIG. 10, for example, when the three-dimensional icon of the camera is compressed upward and downward, the three-dimensional icon of the camera is compressed and deformed for display. When a compressed amount of the compressing input reaches a preset threshold, an exploded rendered image of the three-dimensional icon of the camera is displayed, and a pop-up window of an uninstallation prompt message is displayed to remind the user whether to uninstall the initial application corresponding to the three-dimensional icon, that is, the camera. If the user clicks OK, the camera is uninstalled. If the user clicks Cancel, the three-dimensional icon of the camera is restored.

In the embodiments of this application, by generating a three-dimensional icon of a target application and adding a sub icon to the three-dimensional icon, quick entries of a plurality of application interfaces may be associated with the three-dimensional icon, so that it is convenient to quickly find and enter the application interface associated with the target application. In addition, a display area occupied by the icons and the quick entries can be reduced, and a display interface is concise. An association between different applications can be implemented to implement various functions.

It should be noted that an execution subject of the display method in the embodiments of this application may be a display apparatus, or a control module for performing the display method in the display apparatus. In the embodiments of this application, the display apparatus according to an embodiment of this application is described by using an example in which the display apparatus performs the display method.

Figure 11:
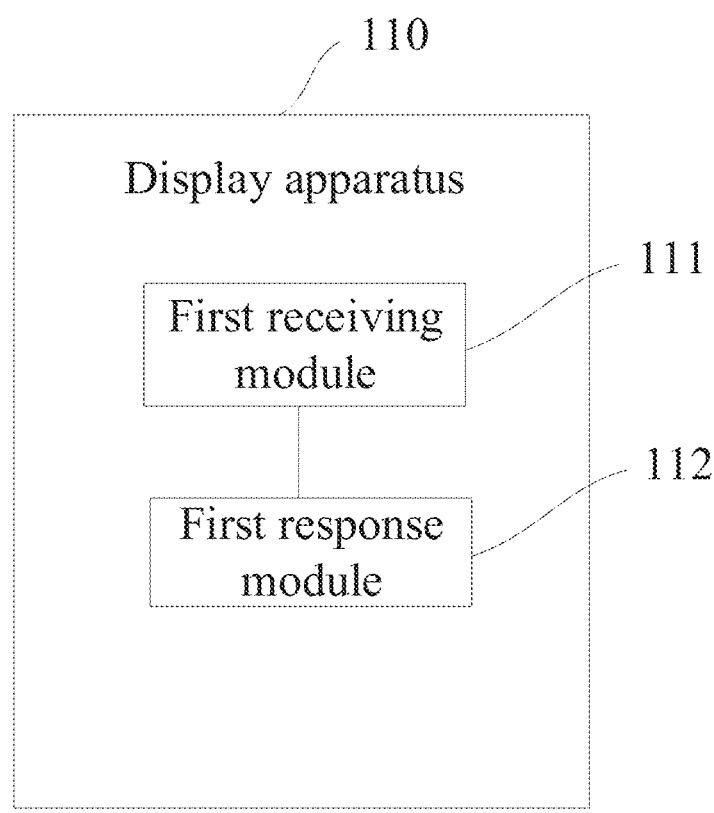
FIG. 11 is a schematic diagram of a display apparatus according to an embodiment of this application.

FIG. 11 is a schematic diagram of a display apparatus according to an embodiment of this application. As shown in FIG. 11, the display apparatus 110 provided in the embodiments of this application may include:
a first receiving module 111, configured to receive a first input by a user to an icon of a target application, where the icon of the target application is a two-dimensional icon; and
a first response module 112, configured to display a three-dimensional icon in response to the first input, where the three-dimensional icon includes an icon and a sub icon of the target application, and the sub icon is a quick entry to an application interface of the target application or another application.

In some embodiments, the first response module 112 includes:
a first response unit, configured to switch the icon of the target application from a two-dimensional icon to a three-dimensional icon, add a sub icon to the three-dimensional icon, and place and hide the sub icon in a three-dimensional space of the three-dimensional icon.

In some embodiments, the apparatus further includes:
a second receiving module, configured to receive a viewing input by the user to view the sub icon in the three-dimensional space of the three-dimensional icon; and
a second response module, configured to, in response to the viewing input, display the sub icon in the three-dimensional space of the three-dimensional icon on a periphery of the three-dimensional icon.

In some embodiments, the first response module includes:
a second response unit, configured to switch the icon of the target application from a two-dimensional icon to a three-dimensional icon, and add a sub icon to a surface of the three-dimensional space of the three-dimensional icon, where the three-dimensional icon includes at least one surface of the three-dimensional space.

In some embodiments, the apparatus further includes:
a third receiving module, configured to receive an associated input by the user to at least two target sub icons of at least two three-dimensional icons; and
a third response module, configured to, in response to the associated input, associate and bind an application interface corresponding to the at least two target sub icons.

In some embodiments, the apparatus further includes:
an interaction module, configured to, in a case that a first event is triggered on an application interface corresponding to one of the target sub icons, perform a preset operation corresponding to the first event on an application interface corresponding to another one of the target sub icons.

In some embodiments, the apparatus further includes:
a fourth receiving module, configured to receive a start input by the user to the sub icon; and
a fourth response module, configured to start an application interface corresponding to the sub icon in response to the start input.

In some embodiments, the apparatus further includes:
a fifth receiving module, configured to receive a pressing input by the user to the three-dimensional icon; and
a fifth response module, in response to the pressing input, displaying an exploded rendered image and uninstallation prompt information of the three-dimensional icon, where the uninstallation prompt information is used to prompt the user whether to uninstall an initial application corresponding to the three-dimensional icon.

In the embodiments of this application, by generating a three-dimensional icon of a target application and adding a sub icon to the three-dimensional icon, quick entries of a plurality of application interfaces may be associated with the three-dimensional icon, so that it is convenient to quickly find and enter the application interface associated with the target application. In addition, a display area occupied by the icons and the quick entries can be reduced, and a display interface is concise.

The display apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted terminal, a wearable device, an Ultra-Mobile Personal Computer (UMPC), a netbook, a Personal Digital Assistant (PDA), or the like. The non-mobile electronic device may be a server, a Network Attached Storage (NAS), a Personal Computer (PC), a Television (TV), a teller machine, a self-service machine, or the like. This is not specifically limited in the embodiments of this application.

The display apparatus in the embodiments of this application may be an apparatus with an operating system. The operating system may be an Android operating system, may be an iOS operating system, or may be another possible operating system. This is not specifically limited in the embodiments of this application.

The display apparatus provided in the embodiments of this application can implement processes implemented in the method embodiments from FIG. 1 to FIG. 10. To avoid repetition, details are not described herein again.

Figure 12:
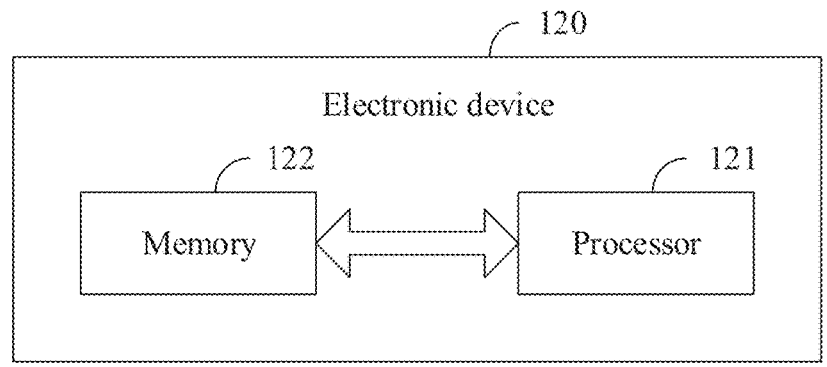
FIG. 12 is a schematic diagram of an electronic device according to an embodiment of this application.

For example, as shown in FIG. 12, an embodiment of this application further provides an electronic device 120, including a processor 121, a memory 122, and a program or an instruction stored in the memory 122 and capable of running on the processor 121. When the program or the instruction is executed by the processor 121, the processes of the foregoing display method embodiments are implemented, with the same technical effects achieved. To avoid repetition, details are not described herein again.

It should be noted that the electronic device in the embodiments of this application includes the foregoing mobile electronic device and the foregoing non-mobile electronic device.

Figure 13:
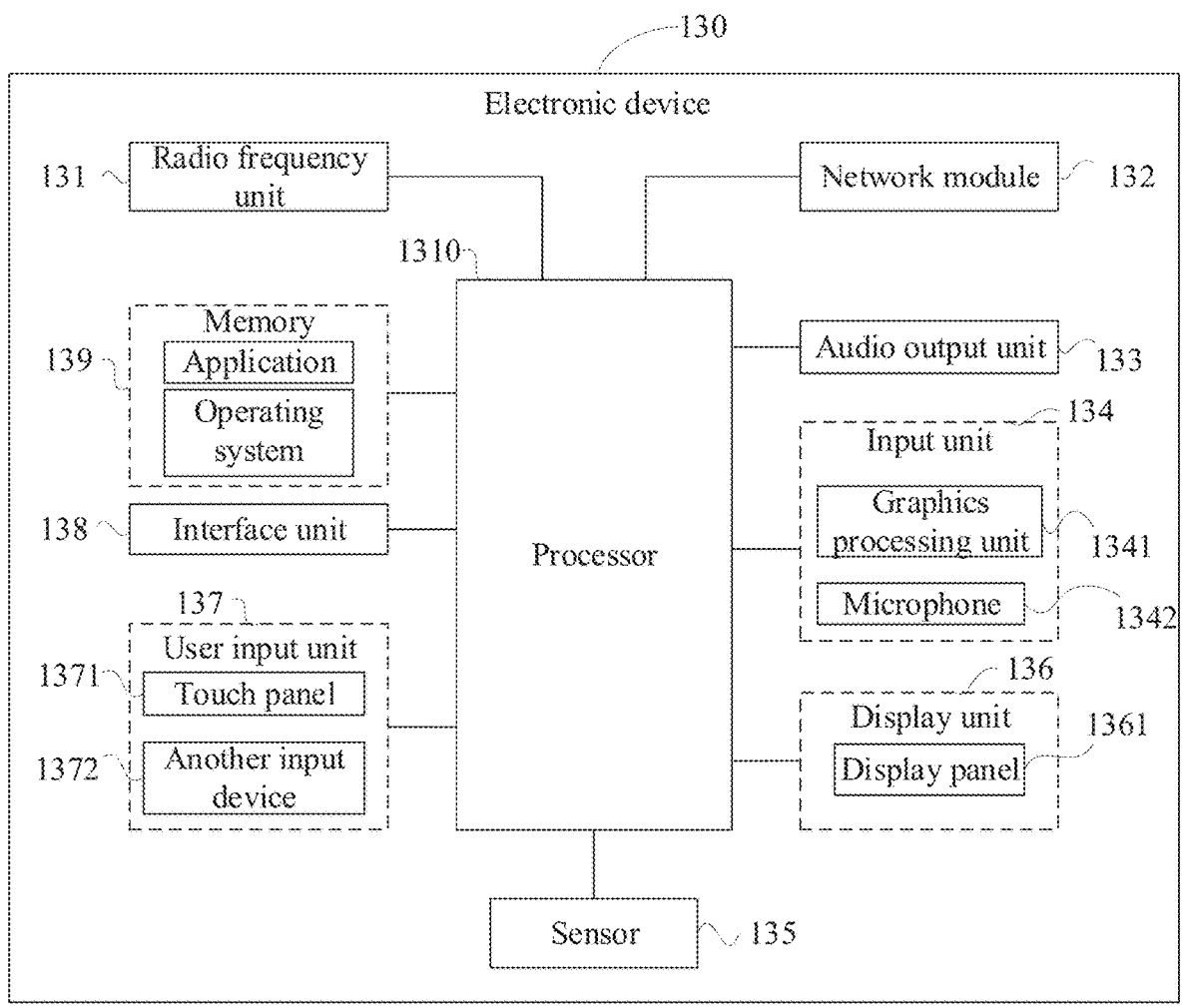
FIG. 13 is a schematic diagram of a hardware structure of an electronic device according to an embodiment of this application.

FIG. 13 is a schematic diagram of a hardware structure of an electronic device according to an embodiment of this application.

An electronic device 130 includes but is not limited to components such as a radio frequency unit 131, a network module 132, an audio output unit 133, an input unit 134, a sensor 135, a display unit 136, a user input unit 137, an interface unit 138, a memory 139, and a processor 1310.

It may be understood by a person skilled in the art that the electronic device 130 may further include a power supply (such as a battery) that supplies power to each component. The power supply may be logically connected to the processor 1310 by using a power management system, to implement functions such as charging, discharging, and power consumption management by using the power management system. A structure of the electronic device shown in FIG. 13 does not constitute a limitation on the electronic device, and may include more or fewer components than those shown in the figure, or combine some components, or have different part arrangements. Details are not described herein again.

The user input unit 137 is configured to receive an input by the user for adding a sub icon to an icon of a target application.

The display unit 136 is configured to display a three-dimensional icon in response to the first input, where the three-dimensional icon includes an icon and a sub icon of the target application, and the sub icon is a quick entry to an application interface of the target application or another application.

In the embodiments of this application, by generating a three-dimensional icon of a target application and adding a sub icon to the three-dimensional icon, quick entries of a plurality of application interfaces may be associated with the three-dimensional icon, so that it is convenient to quickly find and enter the application interface associated with the target application. In addition, a display area occupied by the icons and the quick entries can be reduced, and a display interface is concise.

In some embodiments, the display unit 136 is further configured to switch the icon of the target application from a two-dimensional icon to a three-dimensional icon, add a sub icon to the three-dimensional icon, and place and hide the sub icon in a three-dimensional space of the three-dimensional icon.

In some embodiments, the user input unit 137 is further configured to receive a viewing input by the user to view the sub icon in the three-dimensional space of the three-dimensional icon.

In some embodiments, the display unit 136 is configured to, in response to the viewing input, display the sub icon in the three-dimensional space of the three-dimensional icon on a periphery of the three-dimensional icon.

In some embodiments, the display unit 136 is further configured to switch the icon of the target application from a two-dimensional icon to a three-dimensional icon, and add a sub icon to a surface of the three-dimensional space of the three-dimensional icon, where the three-dimensional icon includes at least one surface of the three-dimensional space.

In some embodiments, the user input unit 137 is further configured to receive an associated input by the user to at least two target sub icons of at least two three-dimensional icons.

In some embodiments, the processor 1310 is configured to, in response to the associated input, associate and bind an application interface corresponding to the at least two target sub icons.

In some embodiments, the processor 1310 is further configured to, in a case that a first event is triggered on an application interface corresponding to one of the target sub icons, perform a preset operation corresponding to the first event on an application interface corresponding to another one of the target sub icons.

In some embodiments, the user input unit 137 is further configured to receive a start input by the user to the sub icon.

In some embodiments, the display unit 136 is further configured to start an application interface corresponding to the sub icon in response to the start input.

In some embodiments, the user input unit 137 is further configured to receive a pressing input by the user to the three-dimensional icon.

In some embodiments, the display unit 136 is further configured to, in response to the pressing input, display an exploded rendered image and uninstallation prompt information of the three-dimensional icon, where the uninstallation prompt information is used to prompt the user whether to uninstall an initial application corresponding to the three-dimensional icon.

It should be understood that, in the embodiments of this application, the input unit 134 may include a Graphics Processing Unit (GPU) 1341 and a microphone 1342, and the Graphics Processing Unit 1341 processes image data of a still picture or a video obtained by an image capture apparatus (such as a camera) in a video capture mode or an image capture mode. The display unit 136 may include a display panel 1361, and the display panel 1361 may be configured in a form of a liquid crystal display, an organic light emitting diode, or the like. The user input unit 137 includes a touch panel 1371 and another input device 1372.

The touch panel 1371 is also referred to as a touchscreen. The touch panel 1371 may include two parts: a touch detection apparatus and a touch controller. The another input device 1372 may include but is not limited to a physical keyboard, a functional button (such as a volume control button or a power on/off button), a trackball, a mouse, and a joystick. Details are not described herein. The memory 139 may be configured to store a software program and various data, including but not limited to an application program and an operating system. The processor 1310 may be integrated with an application processor and a modem processor. The application processor mainly processes an operating system, a user interface, an application program; and the like. The modem processor mainly processes wireless communication. It can be understood that, in some alternative embodiments, the modem processor may not be integrated into the processor 1310.

An embodiment of this application further provides a readable storage medium, where the readable storage medium stores a program or an instruction, and when the program or the instruction is executed by a processor, the processes of the foregoing display method embodiments are implemented, with the same technical effect achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of this application further provides a chip. The chip includes a processor and a communications interface, and the communications interface is coupled to the processor. The processor is configured to run a program or an instruction to implement various processes of the foregoing display method embodiments, with the same technical effects achieved. To avoid repetition, details are not described herein again.

It should be understood that the chip mentioned in the embodiments of this application may also be referred to as a system-level chip, a system chip, a chip system, or an on-chip system chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. In some embodiments, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A display method, comprising:
   receiving a first input by a user on an icon of a target application displayed on a desktop, wherein the desktop displays at least two two-dimensional icons, and the icon of the target application is one of the at least two two-dimensional icons; and
   displaying a three-dimensional icon corresponding to the icon on which the first input is received in response to the first input, while keeping remaining two-dimensional icons displayed on the desktop two-dimensional, wherein the three-dimensional icon comprises an icon and a sub icon of the target application, and the sub icon is a quick entry to an application interface of the target application or another application.

2. The display method according to claim 1, wherein the displaying a three-dimensional icon comprises:
   switching the icon of the target application from a two-dimensional icon to a three-dimensional icon,
   adding a sub icon to the three-dimensional icon, and
   placing and hiding the sub icon in a three-dimensional space of the three-dimensional icon.

3. The display method according to claim 2, wherein after the adding a sub icon to the three-dimensional icon, the display method further comprises:
   receiving a viewing input by the user to view the sub icon in the three-dimensional space of the three-dimensional icon; and
   in response to the viewing input, displaying the sub icon in the three-dimensional space of the three-dimensional icon on a periphery of the three-dimensional icon.

4. The display method according to claim 1, wherein the displaying a three-dimensional icon comprises:
   switching the icon of the target application from a two-dimensional icon to a three-dimensional icon, and
   adding a sub icon to a surface of the three-dimensional space of the three-dimensional icon, wherein the three-dimensional icon comprises at least one surface of the three-dimensional space.

5. The display method according to claim 4, wherein after the adding a sub icon to a surface of the three-dimensional space of the three-dimensional icon, the method further comprises:
   receiving an associated input by the user to at least two target sub icons of at least two three-dimensional icons; and
   in response to the associated input, associating and binding an application interface corresponding to the at least two target sub icons.

6. The display method according to claim 5, wherein after the associating and binding an application interface corresponding to the at least two target sub icons, the method further comprises:
when a first event is triggered on an application interface corresponding to one of the target sub icons, performing a preset operation corresponding to the first event on an application interface corresponding to another one of the target sub icons.

7. The display method according to claim 1, wherein after the displaying a three-dimensional icon, the method further comprises:
receiving a start input by the user to the sub icon; and
starting an application interface corresponding to the sub icon in response to the start input.

8. The display method according to claim 1, wherein after the displaying a three-dimensional icon, the method further comprises:
receiving a pressing input by the user to the three-dimensional icon; and
in response to the pressing input, displaying an exploded rendered image and uninstallation prompt information of the three-dimensional icon, wherein the uninstallation prompt information is used to prompt the user whether to uninstall an initial application corresponding to the three-dimensional icon.

9. An electronic device, comprising a processor; and a memory having a computer program or an instruction stored thereon, wherein the computer program or the instruction, when executed by the processor, causes the processor to perform a display method, comprising:
receiving a first input by a user on an icon of a target application displayed on a desktop, wherein the desktop displays at least two two-dimensional icons, and the icon of the target application is one of the at least two two-dimensional icons; and
displaying a three-dimensional icon corresponding to the icon on which the first input is received in response to the first input, while keeping remaining two-dimensional icons displayed on the desktop two-dimensional, wherein the three-dimensional icon comprises an icon and a sub icon of the target application, and the sub icon is a quick entry to an application interface of the target application or another application.

10. The electronic device according to claim 9, wherein the displaying a three-dimensional icon comprises:
switching the icon of the target application from a two-dimensional icon to a three-dimensional icon,
adding a sub icon to the three-dimensional icon, and
placing and hiding the sub icon in a three-dimensional space of the three-dimensional icon.

11. The electronic device according to claim 10, wherein after the adding a sub icon to the three-dimensional icon, the display method further comprises:
receiving a viewing input by the user to view the sub icon in the three-dimensional space of the three-dimensional icon; and
in response to the viewing input, displaying the sub icon in the three-dimensional space of the three-dimensional icon on a periphery of the three-dimensional icon.

12. The electronic device according to claim 9, wherein the displaying a three-dimensional icon comprises:
switching the icon of the target application from a two-dimensional icon to a three-dimensional icon, and
adding a sub icon to a surface of the three-dimensional space of the three-dimensional icon, wherein the three-dimensional icon comprises at least one surface of the three-dimensional space.

13. The electronic device according to claim 12, wherein after the adding a sub icon to a surface of the three-dimensional space of the three-dimensional icon, the method further comprises:
receiving an associated input by the user to at least two target sub icons of at least two three-dimensional icons; and
in response to the associated input, associating and binding an application interface corresponding to the at least two target sub icons.

14. The electronic device according to claim 13, wherein after the associating and binding an application interface corresponding to the at least two target sub icons, the method further comprises:
when a first event is triggered on an application interface corresponding to one of the target sub icons, performing a preset operation corresponding to the first event on an application interface corresponding to another one of the target sub icons.

15. The electronic device according to claim 9, wherein after the displaying a three-dimensional icon, the method further comprises:
receiving a start input by the user to the sub icon; and
starting an application interface corresponding to the sub icon in response to the start input.

16. The electronic device according to claim 9, wherein after the displaying a three-dimensional icon, the method further comprises:
receiving a pressing input by the user to the three-dimensional icon; and
in response to the pressing input, displaying an exploded rendered image and uninstallation prompt information of the three-dimensional icon, wherein the uninstallation prompt information is used to prompt the user whether to uninstall an initial application corresponding to the three-dimensional icon.

17. A non-transitory computer-readable storage medium, storing a computer program or an instruction that, when executed by a processor, causes the processor to perform a display method, comprising:
receiving a first input by a user on an icon of a target application displayed on a desktop, wherein the desktop displays at least two two-dimensional icons, and the icon of the target application is one of the at least two two-dimensional icons; and
displaying a three-dimensional icon corresponding to the icon on which the first input is received in response to the first input, while keeping remaining two-dimensional icons displayed on the desktop two-dimensional, wherein the three-dimensional icon comprises an icon and a sub icon of the target application, and the sub icon is a quick entry to an application interface of the target application or another application.

18. The non-transitory computer-readable storage medium according to claim 17, wherein the displaying a three-dimensional icon comprises:
switching the icon of the target application from a two-dimensional icon to a three-dimensional icon,
adding a sub icon to the three-dimensional icon, and
placing and hiding the sub icon in a three-dimensional space of the three-dimensional icon.

19. The non-transitory computer-readable storage medium according to claim 18, wherein after the adding a sub icon to the three-dimensional icon, the display method further comprises:
- receiving a viewing input by the user to view the sub icon in the three-dimensional space of the three-dimensional icon; and
- in response to the viewing input, displaying the sub icon in the three-dimensional space of the three-dimensional icon on a periphery of the three-dimensional icon.

20. The non-transitory computer-readable storage medium according to claim 17, wherein the displaying a three-dimensional icon comprises:
- switching the icon of the target application from a two-dimensional icon to a three-dimensional icon, and
- adding a sub icon to a surface of the three-dimensional space of the three-dimensional icon, wherein the three-dimensional icon comprises at least one surface of the three-dimensional space.

* * * * *